Patented Jan. 12, 1954

2,666,017

UNITED STATES PATENT OFFICE 2,666,017

NUTRIENT MEDIA CONTAINING ANTIFOAMING AGENTS

Henry V. Moss and Roy E. Morse, Anniston, Ala., assignors to Monsanto Chemical Company, St. Louis, Mo., a corporation of Delaware No Drawing. Application July 14, 1950,
Serial No. 173,936

10 Claims. (Cl. 195—100)

The present invention relates to a method of inhibiting, diminishing or preventing the development of excessive amounts of foam in the manufacture of yeast, molds, bacteria, related microorganisms of fermentation, their derivatives and by-products such as penicillin, streptomycin, etc. It also relates to substantially non-foaming nutrient media which are eminently suitable for use in the production of the above products, and to the method of preparing same.

In accordance with current practice in the fermentation industry, yeasts, molds, bacteria, related microorganisms of fermentation, their derivatives and by-products such as penicillin, streptomycin, etc. are propagated or produced in suitable nutrient media containing carbohydrates such as sugar, starch, etc., a usable source of nitrogen, nutrilites and various salts which supply essential mineral elements. These nutrient media are divided into two general classes, namely, natural and synthetic.

Natural nutrient media are the juices of fruits or plants in their natural state. For example, the expressed juices of grapes, apples, pears and other fruits are excellent media since they contain sugars along with nitrogen-containing compounds and dissolved salts at a pH favorable to the development of the above microorganisms of fermentation, their derivatives and by-products.

Synthetic media are artifically prepared aqueous compositions including sugars and various inorganic salts and organic compounds. A typical example is one prepared by mixing together in suitable proportions crude beet molasses, calcium phosphate, ammonium monohydrogen phosphate, urea, concentrated sulfuric or phosphoric acid and water.

In the commercial production of microorganisms of fermentation, their derivatives and by-products, it has been found essential to aerate the nutrient media during propagation in order to produce the desired product in good yields and in a minimum amount of time. For example, if aeration is not employed in the manufacture of yeast, the propagation of this product proceeds at a relatively slow rate. Moreover, the yield of alcohol is increased at the expense of the yeast with the result that the yield of the latter is substantially reduced. This highly undesirable result is overcome by the above expedient, but it introduces a serious foaming problem which has been attacked by mechanical and/or chemical defoaming means. However, for one reason or another they have not been entirely satisfactory, and, consequently, there has been an urgent demand by the fermentation industry for a solution to this problem.

It is, therefore, an object of the present invention to provide a commercially and economically feasible method and means of inhibiting, diminishing or preventing the development of excessive amounts of foam in the manufacture of yeast, molds, bacteria, related microorganisms of fermentation, their derivatives and by-products.

Another object of the invention is to provide substantially non-foaming nutrient media which are admirably suitable for use in the commercial manufacture of the above products.

A further object of the invention is to provide a new series of antifoaming agents for use in the fermentation industry.

Additional objects and advantages will be apparent to those skilled in the art as the description of the instant invention proceeds.

In accordance with the present invention, the surprising discovery has been made that if a relatively small amount of an ethylene oxide derivative of the type hereinafter described is added to natural and/or synthetic nutrient media used in the propagation or production of microorganisms of fermentation, their derivatives and by-products, excessive foaming of the resulting media, upon aeration, is effectively inhibited or minimized. Stated in a different manner, the media treated in the above manner are characterized by the fact that they are substantially non-foaming or are stabilized against the development of excessive amounts of foam upon aeration.

The amount of ethylene oxide derivative used to inhibit or minimize foaming may fluctuate within wide limits depending upon various conditions hereinafter described, but it is desirable for economic reasons not to use more than 10% by weight of the above material. In general, about 0.001% to about 3% and preferably about 0.1% to about 0.2% by weight of the ethylene oxide derivative is sufficient to solve the foaming problem encountered in most situations in the fermentation industry. However, it is to be understood that the invention is not restricted to the above numerical limits since larger or smaller amounts may be used if required.

The ethylene oxide derivatives contemplated by the instant invention are those prepared by condensing abietic acid or products containing same such as rosin, rosin oil or tall oil with about 0.75 to about 6 moles of ethylene oxide per mole of abietic acid or tall oil. Stated in terms of parts by weight, the above derivatives are prepared by condensing about 1 to about 9.5 parts by weight of rosin or rosin oil (basis abietic acid) with 1 part by weight of ethylene oxide or by condensing about 1 to about 10.5 parts by weight of tall oil (average molecular weight: 290-333) with 1 part by weight of ethylene oxide.

By mole of tall oil is meant the average molecular weight of the components of tall oil.

The method of preparing one of the above ethylene oxide derivatives is described in detail in application, S. N. 122,585, filed October 20, 1949, in the name of Earl W. Gluesenkamp, which application is assigned to the same assignee as the present invention and is incorporated by reference into the present specification. The method of preparing the other derivatives is the same except for the variation in ratio of ethylene oxide to tall oil or abietic acid.

Tall oil is subject to considerable variation in composition being in part dependent on the species of wood processed, the season of the year the tree was cut, the age of the tree, the storage life of the wood, the procedure for processing the chips and converting the black liquor into tall oil, etc. Thus, the average analysis of tall oil from fifteen mills ranged from 36 to 54 percent fatty acids, 38 to 58 per cent rosin acids and 6 to 18 percent unsaponifiable. In view of the above variation in composition, it can be seen that the average molecular weight of tall oil will vary accordingly.

For a more complete understanding of the present invention, reference is made to the following description of the method and apparatus used to evaluate the antifoaming properties of the ethylene oxide derivatives of the present invention, and also to the experimental data hereinafter presented, which illustrate the effectiveness of the above compounds in preventing or inhibiting the development of excessive foam.

The apparatus consisted essentially of a constant temperature water bath equipped with a stirrer, a heating coil and suitable thermostatic controls by which the bath temperature was maintained at 30° C. ± 0.2° C.; a tubular pyrex foam tower (48 mm. in diameter and 55 cm. in length) standing in the above bath, said tower being provided at a distance of 3 cm. from its bottom with a coarse fritted disc; and a supply of air which was conducted through a glass wool filter, an orifice flow meter and a glass take-off tube, passing downwardly through the bath into the tower at a point immediately above its bottom.

The air was conveyed at the rate of 0.125 cu. ft./min. into the bottom of the tower where it was allowed to trickle upwardly through the fritted disc to produce small air bubbles.

The foam producing material employed in the above apparatus was prepared in the following manner.

A commercial cane syrup was adjusted to a pH of 4.5 by the addition of hydrochloric acid, whereupon it was diluted with water to a specific gravity of 1.039 at 20° C./20° C. This product was then packed into pint home canning jars, preserved by processing in boiling water and cooled by means of air. Using this syrup, the foam-forming material was produced by mixing the former with bakers' yeast in the proportions hereinafter indicated and then mechanically stirring the mixture for 5 minutes to insure complete suspension of the yeast.

In practice, the bath and foam tower were brought to a temperature of about 30° C. and the introduction of air initiated. Then, the above-described foam-forming material was added to the foam tower and continuously aerated to reactivate the yeast. The reactivation of the yeast could be recognized readily by the character of the resulting foam since it was quite different from that produced prior to reactivation; this difference was probably due to cell surface changes brought about by change-over from quiescence to active respiration.

As soon as the yeast had been reactivated and the foam had begun to rise in the tower, the antifoaming agent was added and the time of the addition observed. Thereafter, the time required for failure of the antifoaming agent was observed and recorded. After failure of the antifoaming agent, the yeast was separated from the syrup, washed three times with cold distilled water and observed for viability and odor.

The viability of the yeast was determined by its appearance and behavior on the filter. Since the tests had been run for less than 18 hours, complete exhaustion of the syrup by the yeast was not achieved, and, therefore, gas evolution was evident on the filter pad due to the continuing respiration. On the other hand, if the yeast had been damaged by the antifoaming agent, no respiratory gases were apparent on the filter pad, and, moreover, the cell morphology was altered with the result that small, close-packing cells and cellular contents were formed which markedly increased the filtering time.

Using the above-described method of evaluating antifoaming agents, tall oil and various ethylene oxide derivatives thereof were tested with the results indicated in the following table.

*Table*

| Composition of nutrient medium | Antifoaming agent | Odor of finished yeast | Toxicity of antifoaming agent on yeast | Aeration time in hours | Foaming height in centimeters |
|---|---|---|---|---|---|
| Cane syrup (sp. gr. 1.039), 207.8 gms. Bakers' yeast, 2.0 gms. Antifoaming agent, 0.05 ml. | Refined tall oil (sp. gr. at 25° C./25° C. =1.066). | Normal | Non-toxic | 2.5 | 15.0 |
| Cane syrup, 104.0 gms. Bakers' yeast, 1.0 gms. Antifoaming agent, 0.2 ml. | Condensation product of ethylene oxide with refined tall oil in molar ratio of 0.25:1. | do | do | 0.5 | 45 |
| Cane syrup, 104.0 gms. Bakers' yeast 1.0 gms. Antifoaming agent, 0.2 ml. | Condensation product of ethylene oxide with refined tall oil in molar ratio of 0.50:1. | do | do | 0.5 | 40 |
| Cane syrup, 104.0 gms. Bakers' yeast, 1.0 gms. Antifoaming agent, 0.2 ml. | Condensation product of ethylene oxide with refined tall oil in molar ratio of 0.75:1. | do | do | 6.0 | 10 |
| Cane syrup (sp. gr. 1.039), 207.8 gms. Bakers' yeast, 2.0 gms. Antifoaming agent, 0.05 ml. | Condensation product of ethylene oxide with refined tall oil in molar ratio of 1:1 (sp. gr. at 25° C./25° C.=0.9971). | do | do | 4.0 | 0.5 |

Table—Continued

| Composition of nutrient medium | Antifoaming agent | Odor of finished yeast | Toxicity of antifoaming agent on yeast | Aeration time in hours | Foaming height in centimeters |
|---|---|---|---|---|---|
| Cane syrup (sp. gr. 1.039), 52.0 gms. Bakers' yeast, 0.5 gm. Antifoaming agent, 0.2 ml. | Condensation product of ethylene oxide with refined tall oil in molar ratio of 1:1 (sp. gr. at 25° C./25° C.=0.9971). | Normal | Non-toxic | 7.0 | 0.5. |
| Cane syrup (sp. gr. 1.039), 207.8 gms. Bakers' yeast, 2.0 gms. Antifoaming agent, 0.05 ml. | Condensation product of ethylene oxide with refined tall oil in molar ratio of 2:1. | ---do--- | ---do--- | 6.5 | 0.5. |
| Cane syrup (sp. gr. 1.039), 207.8 gms. Bakers' yeast, 2.0 gms. Antifoaming agent, 0.05 ml. | Condensation product of ethylene oxide with refined tall oil in molar ratio of 3.08:1 (sp. gr. at 25° C./25° C.=About 1.022). | ---do--- | ---do--- | 6.0 | 0.5. |
| Cane syrup (sp. gr. 1.039), 207.8 gms. Bakers' yeast, 2.0 gms. Antifoaming agent, 0.05 ml. | Condensation product of ethylene oxide with refined tall oil in molar ratio of 5:1 (sp. gr. at 25° C./25° C.=1.040). | ---do--- | ---do--- | 6.0 | 0.5. |
| Cane syrup, 52.0 gms. Bakers' yeast, 0.5 gm. Antifoaming agent, 0.2 ml. | Condensation product of ethylene oxide with refined tall oil in molar ratio of 6:1. | ---do--- | ---do--- | 18 | 8. |
| Cane syrup, 52.0 gms. Bakers' yeast, 0.5 gm. Antifoaming agent, 0.2 ml. | Condensation product of ethylene oxide with refined tall oil in molar ratio of 7:1. | ---do--- | ---do--- | ⅓ | In excess of 55. |
| Cane syrup (sp. gr. 1.039), 207.8 gms. Bakers' yeast, 2.0 gms. Antifoaming agent, 0.05 ml. | Condensation product of ethylene oxide with refined tall oil in molar ratio of 8:1 (sp. gr. at 25° C./25° C.=1.054). | ---do--- | ---do--- | 0.1 | 20.0. |

The above table demonstrates that tall oil—ethylene oxide condensation products containing about 0.75 mole to about 6 moles of ethylene oxide per mole of tall oil have outstanding antifoaming properties, whereas tall oil and tall oil—ethylene oxide condensation products containing less than 0.75 mole of ethylene oxide or more than 6 moles of ethylene oxide per mole of tall oil are of no value as they either induced foaming or had no antifoaming action at all.

The foregoing experimental data have been restricted to nutrient media for yeast propagation, but it is to be understood that the invention is not limited thereto. On the contrary, as indicated earlier in this specification, the invention is of much wider scope being broadly applicable to the solution of the foaming problem encountered in nutrient media used in the propagation of microorganisms of fermentation generally. In this connection, the following are cited as illustrative examples of substantially non-foaming nutrient media which are within the scope of the instant invention.

*Nutrient media for yeast and molds*

| | Grams | Grams | Grams |
|---|---|---|---|
| Sucrose | 10.00 | 10.00 | 15.00 |
| Dextrine | | 0.60 | |
| $NH_4Cl$ | 0.12 | 0.19 | |
| $K_2HPO_4$ (or $KH_2PO_4$) | 0.05 | 0.10 | 0.1 |
| $CaCl_2$ | 0.01 | 0.10 | |
| $Ca_3(PO_4)_2$ | | | 0.1 |
| $MgSO_4$ | 0.02 | | 0.1 |
| Condensation product of ethylene oxide with tall oil in molar ratio of 1:1 | 0.25 | 0.25 | 0.25 |
| Water | 100.00 | 100.00 | 100.00 |

*Nutrient medium for penicillin*

Percent by weight
Lactose _____ 2.500
Cerelose _____ .500
Corn steep liquor solids_____ 2.000
$ZnSO_4$ _____ 0.005
$CaCO_3$ _____ 0.100
Precursor [1] _____ 0.050

[1] Examples of precursors which may be used are β-phenyl, ethylamine acetate, N-(2,2-diethoxyethyl) phenylacetamide, N-(1,3-dihydroxy-2-propyl) phenyl-acetamide, phenethyl amine, β-p-hydroxyphenethylamine, phenylaceto-nitrile, phenylacetamidine, β-phenyl-α-alanine, phenylpyruvic acid, phenyl acetamide, phenyl acetaldehyde, phenylacetic acid, and phenylacetylglycine.

*Nutrient medium for penicillin—Continued*

Percent by weight
Vegetative inoculum (*Penicillium notatum*) _____ 7.000
Condensation product of ethylene oxide with tall oil in molar ratio of 1 : 3 : 1___ 3.000
Water _____ 84.815

*Nutrient medium for streptomycin*

Percent by weight
Carbohydrate (dry weight) _____ 2.00
Soybean meal _____ 2.00
Corn, steep liquor solids _____ 0.50
NaCl _____ 0.25
$CaCO_3$ _____ 0.10
Vegetative inoculum (*Streptomyces griseus*) _____ 7.00
Condensation product of ethylene oxide with tall oil in molar ratio of 1 : 1 _____ 3.00
Water _____ 85.95

As pointed out earlier herein, it is not desirable for economic reasons to add more than 10% by weight of the ethylene oxide derivative to nutrient media used in the propagation of yeast, molds, bacteria, related microorganisms of fermentation, their derivatives and by-products such as penicillin, streptomycin, etc., but more may be used if required. In general, about 0.001% to about 3% and preferably about 0.1% to about 1.0% by weight of the antifoaming agent is sufficient to overcome the foaming encountered in the use of the above media.

The minimum, optimum and maximum amounts of ethylene oxide derivative which may be used to inhibit foaming depends upon one or more of a number of conditions such as the selected antifoaming agent; the microorganism of fermentation to be propagated; the composition, pH and temperature of the nutrient medium; the volume to surface ratio of the nutrient medium; the bubble size; the air pressure used in aerating; and the rate of aeration and aeration time. Therefore, any attempt to numerically define the concentration of the antifoaming agent so as to meet all situations would be impractical and meaningless. However, since this may be readily determined by one skilled in the art, suffice it to say that it may be generically defined by stating that the antifoaming agent is employed in an

We claim:

1. An aqueous nutrient fermentation medium normally having a tendency to foam excessively and a sufficient amount of an antifoaming agent to render said medium substantially non-foaming, said agent being the condensation product of about 0.75 to about 6 mols of ethylene oxide with 1 mole of a material selected from the group consisting of abietic acid and products containing same.

2. An aqueous nutrient fermentation medium normally having a tendency to foam excessively and about 0.001% to about 10% by weight of an antifoaming agent, said agent being the condensation product of about 0.75 to about 6 moles of ethylene oxide with 1 mole of a material selected from the group consisting of abietic acid and tall oil.

3. An aqueous nutrient fermentation medium normally having a tendency to foam excessively and about 0.001% to about 3% by weight of an antifoaming agent, said agent being the condensation product of from 1 to 6 moles of ethylene oxide with 1 mole of a material selected from the group consisting of abietic acid and tall oil.

4. An aqueous nutrient fermentation medium normally having a tendency to foam excessively and about 0.1% to about 0.2% by weight of an antifoaming agent, said agent being the condensation product of 1 mole of ethylene oxide with 1 mole of a material selected from the group consisting of abietic acid and tall oil.

5. An aqueous nutrient fermentation medium normally having a tendency to foam excessively and about 0.1% to about 0.2% by weight of an antifoaming agent, said agent being the condensation product of 1 mole of ethylene oxide with 1 mole of tall oil.

6. The method of substantially inhibiting the development of foam in aqueous nutrient fermentation media normally having a tendency to foam excessively, which comprises adding to said media a sufficient amount of an antifoaming agent to inhibit foaming, said agent being the condensation product of about 0.75 to about 6 moles of ethylene oxide with 1 mole of a material selected from the group consisting of abietic acid and products containing same.

7. The method of substantially inhibiting the development of foam in aqueous nutrient fermentation media normally having a tendency to foam excessively, which comprises adding to said media about 0.001% to about 10% by weight of an antifoaming agent, said agent being the condensation product of about 0.75 to about 6 moles of ethylene oxide with 1 mole of a material selected from the group consisting of abietic acid and tall oil.

8. The method of substantially inhibiting the development of foam in aqueous nutrient fermentation media normally having a tendency to foam excessively, which comprises adding to said media about 0.001% to about 3% by weight of an antifoaming agent, said agent being the condensation product of from 1 to 6 moles of ethylene oxide with 1 mole of a material selected from the group consisting of abietic acid and tall oil.

9. The method of substantially inhibiting the development of foam in aqueous nutrient fermentation media normally having a tendency to foam excessively, which comprises adding to said media about 0.1% to about 0.2% by weight of an antifoaming agent, said agent being the condensation product of 1 mole of ethylene oxide with 1 mole of a material selected from the group consisting of abietic acid and tall oil.

10. The method of substantially inhibiting the development of foam in aqueous nutrient fermentation media normally having a tendency to foam excessively, which comprises adding to said media about 0.1% to about 0.2% by weight of an antifoaming agent, said agent being the condensation product of 1 mole of ethylene oxide with 1 mole of tall oil.

HENRY V. MOSS.
ROY E. MORSE.

References Cited in the file of this patent

UNITED STATES PATENTS

| Number | Name | Date |
| --- | --- | --- |
| 2,443,989 | Moyer | June 22, 1948 |
| 2,448,790 | Foster et al. | Sept. 7, 1948 |
| 2,469,493 | Barker | May 10, 1949 |
| 2,523,245 | Coppock | Sept. 19, 1950 |
| 2,550,450 | Brown et al. | Apr. 24, 1951 |

FOREIGN PATENTS

| Number | Country | Date |
| --- | --- | --- |
| 467,571 | Great Britain | June 16, 1937 |

OTHER REFERENCES

Bennett, Mono- and di-glycerides, Food Manufacture, July 5, 1940, page 188.